March 12, 1940.  R. W. POINTER  2,193,567
TANDEM TRAILER UNIT
Filed Oct. 3, 1938  2 Sheets-Sheet 1

INVENTOR
ROBERT W. POINTER
BY
ATTORNEY

March 12, 1940.    R. W. POINTER    2,193,567
TANDEM TRAILER UNIT
Filed Oct. 3, 1938    2 Sheets-Sheet 2

INVENTOR
ROBERT W. POINTER
BY
ATTORNEY

Patented Mar. 12, 1940

2,193,567

UNITED STATES PATENT OFFICE 2,193,567

TANDEM TRAILER UNIT

Robert W. Pointer, Portland, Oreg., assignor of one-half to Willamette Iron and Steel Corporation, Portland, Oreg.

Application October 3, 1938, Serial No. 232,955

4 Claims. (Cl. 280—124)

This invention relates generally to land travelling vehicles, and particularly to a tandem trailer unit.

The main object of this invention is to construct a unit which will have great flexibility and which will greatly reduce tire scuffing.

The second object is to produce a unit of the class described having but few moving parts and in which the entire load is carried on coil springs mounted within the frame tubes.

The third object is to construct a unit of the class described which is especially adapted to operate successfully under the severe road shocks to which such vehicles are subjected.

I accomplish these and other objects in the manner set forth in the following specification as illustrated in the accompanying drawings, in which.

Similar numerals refer to similar parts throughout the several views.

Figure 1:
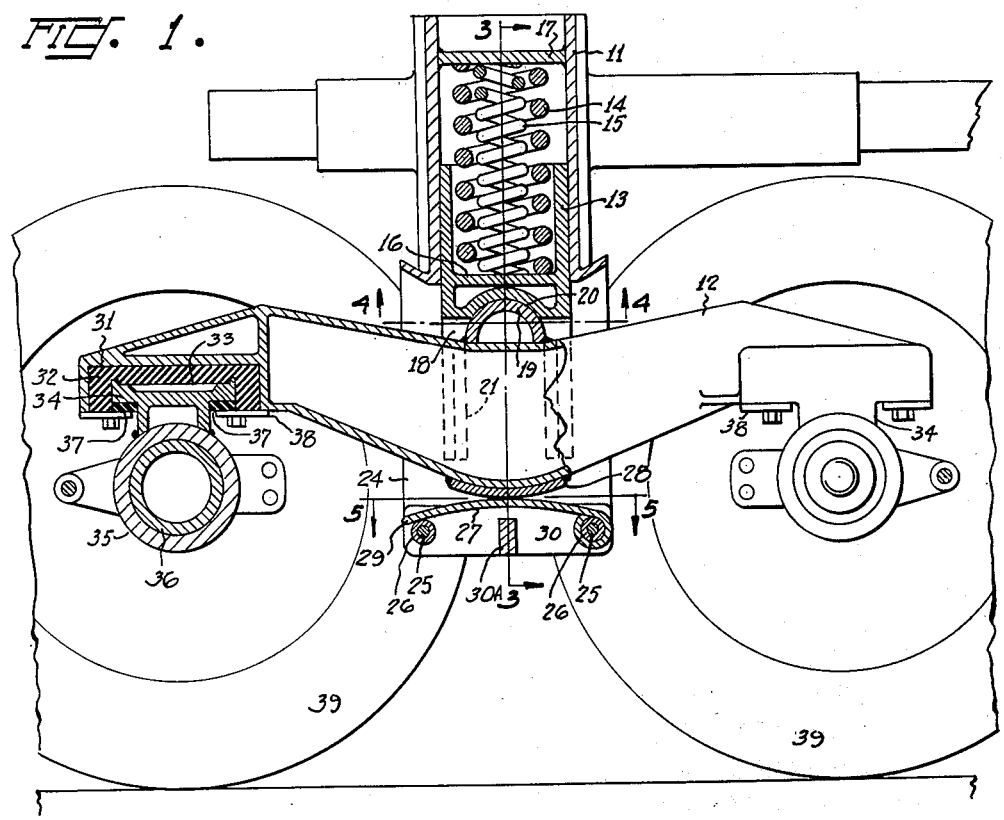
Fig. 1 is a section taken along the line 1—1 in Fig. 2.
Figure 2:
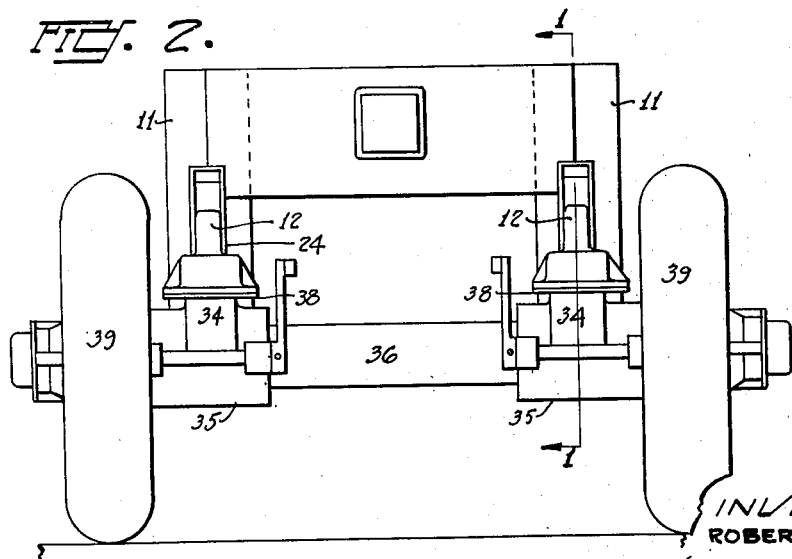
Fig. 2 is an end elevation of the unit.
Figure 3:
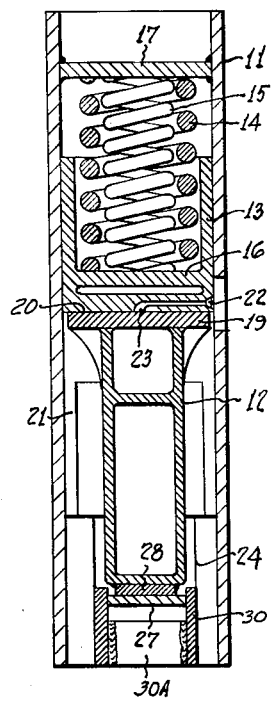
Fig. 3 is a section taken along the line 3—3 in Fig. 1.
Figure 4:
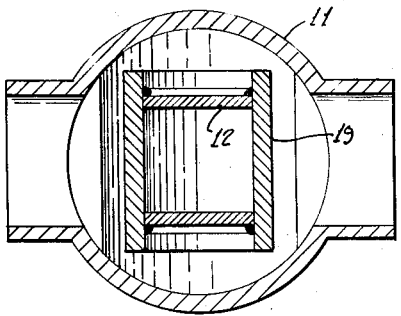
Fig. 4 is a section taken along the line 4—4 in Fig. 1.
Figure 5:
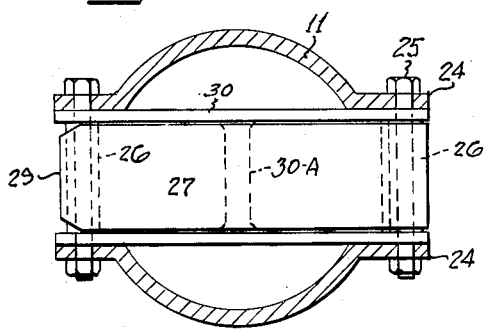
Fig. 5 is a section taken along the line 5—5 in Fig. 1.

Referring in detail to the drawings, there is shown a frame tube 11 which straddles a walking beam 12. Within the tube 11 is slidably disposed the piston 13 within which is placed a large helical spring 14 and a smaller helical spring 15. The springs 14 and 15 are confined between the head 16 of the piston 13 and the head 17 of the frame tube 11. The piston 13 has a slot 18 formed therethrough in one direction. This slot 18 is wide enough to receive the walking beam 12. The walking beam 12 has mounted on its top side a rounded joint 19 which journals in the rounded upper end 20 of the transverse slot 21 which is formed across the piston 13. A hole 22 is formed in the piston 13 through which lubricant may be forced through the duct 23 into the journal.

The frame tube 11 has its lower ends 24 forked and perforated to receive the rebound spring bolts 25 on which are placed the bushings 26. On one of the bushings 26 is mounted the rebound spring 27 which curves upwardly under the curved wearing plate 28 which is secured to the under side of the walking beam 12. The end 29 of the rebound spring 27 rests on the other bushing 26. An H-shaped frame 30 is also carried by the bolts 25 and its cross bar 30—A extends between the sides of the frame 30 and serves to prevent the spring 27 from being overflexed.

In each end of each walking beam 12 is formed a recess 31 in which is placed a rubber cushion 32 having a recess 33 formed therein. In the recess 33 is disposed the cushion table 34 which is secured to the brake spider 35 which in turn is mounted on the axle 36. A rubber pad 37 is mounted on each under side of the table 34 and the pads 37 are held in place by the clamping plates 38 which confine the table 34 within the cushion 32.

The details and advantage of this construction are clearly set forth in my co-pending application No. 232,956, filed October 3, 1938, and will not be repeated here.

The operation of the device is as follows:

The inner spring 15 is preferably longer than the outer spring 14 providing a resilient support for the vehicle under a light load. As the load increases, it is taken up by the heavier outer spring 14. Any inequalities in the roadway cause the walking beam 12 to rock on the rounded joint 19.

It will be apparent that when the springs 14 and 15 are flexed under a load that the spring 27 will be separated from the wearing plate 28. However, on a rebound action the spring 27 will engage the plate 28 and serve to prevent the joint 19 from becoming dislocated.

The purpose of the cross tie 30 is to prevent an excessive rebound action from distorting the spring 27 sufficiently to permit the joint 19 from escaping from its seat 20.

It can thus be seen that the average relationship between a pair of wheels 39 is flexibly maintained by means of the springs 14 and 15 while the relative positions of a pair of wheels 39 on the same side of the unit are adjusted by means of the joint 19, while lateral distortions and road shocks received by the wheels on any given axle 36 are absorbed by the cushions 32 providing thereby an ideal condition for supporting a load upon a tandem trailer unit.

Figure 6:
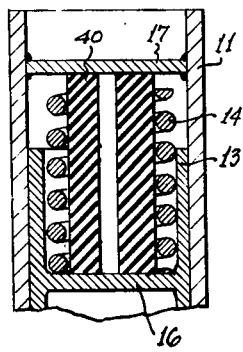
Fig. 6 is a fragmentary section of a modified form of load supporting unit.

In the form of the device shown in Fig. 6 instead of employing the inner spring 15, I utilize a tubular rubber insert 40 which has all of the properties of the spring 15 in addition to a retarding action on the rebound.

Figure 7:
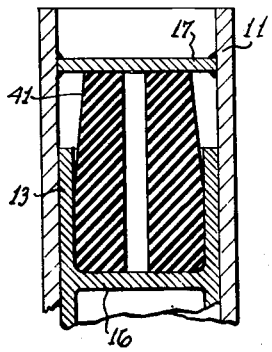
Fig. 7 is a fragmentary section of another modification of the load supporting unit.
Figure 8:
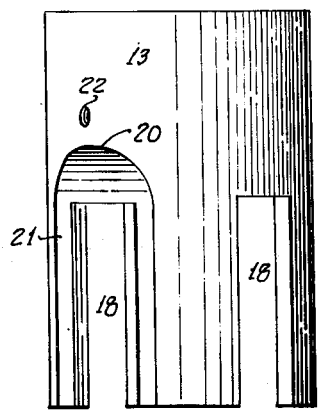
Fig. 8 is a side elevator of the piston.

In Fig. 7 both the springs 14 and 15 are replaced by means of a tapering tubular insert 41 which is seated within the piston 13 and it too functions in the same manner as the springs 14 and 15 and possesses the same rebound opposing characteristic.

I claim:

1. In a tandem trailer unit the combination of a walking beam flexibly supported at each end upon an axle, an upright frame tube having its lower end slotted to straddle said walking beam, a piston slidably mounted within said tube having a rocker joint in the bottom end thereof adapted to receive a corresponding part on said walking beam, a resilient member disposed between the upper end of said piston and said frame tube and a rebound spring disposed on the under side of said walking beam adapted to prevent same from separating from its joint.

2. The tandem unit described in claim 1, characterized by having a limit stop associated with said rebound spring adapted to prevent the joint between said walking beam and its piston from becoming separated.

3. The tandem unit described in claim 1, characterized by having a rubber tubular insert interposed between said piston and said frame tube in which the piston is confined laterally as it is compressed longitudinally.

4. A tandem trailer unit having in combination a frame tube upon the upper end of which a load supporting member is attached, said tube having a forked lower end, a forked piston slidably mounted within said tube having a rocker joint in the fork thereof, a walking beam mounted in the fork of said piston having a rounded upper surface adapted to form a part of said rocker joint, a curved spring disposed within the lower part of said tube fork adapted to absorb rebound shocks and resilient means for attaching an axle to each end of said walking beam.

ROBERT W. POINTER.